Oct. 15, 1946.    J. DUNLOP    2,409,199
ELEVATOR CONTROL SYSTEM
Filed Jan. 24, 1945    6 Sheets-Sheet 3
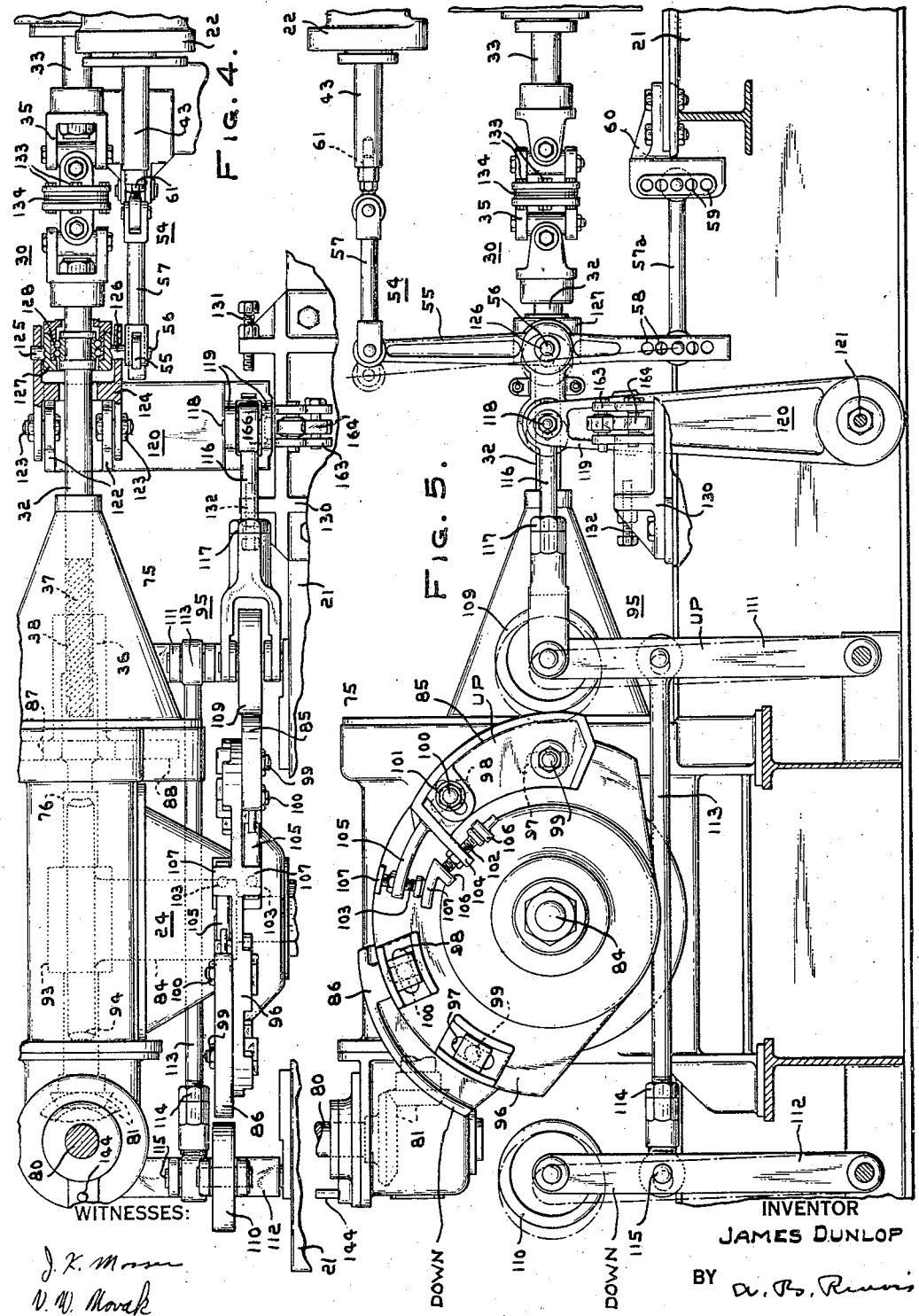
INVENTOR
JAMES DUNLOP
BY
ATTORNEY Oct. 15, 1946.　　　　J. DUNLOP　　　　2,409,199
ELEVATOR CONTROL SYSTEM
Filed Jan. 24, 1945　　　　6 Sheets-Sheet 4
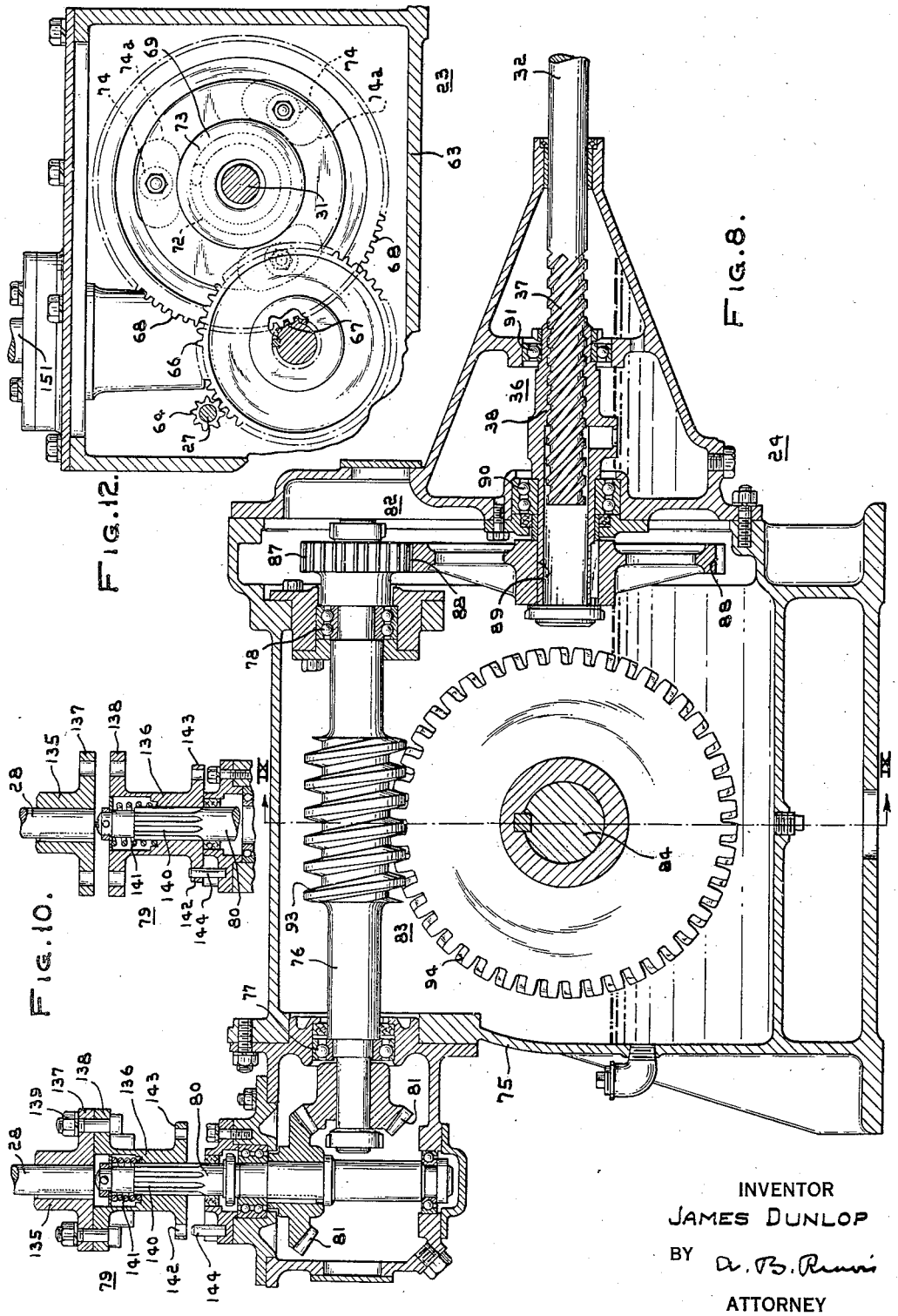
INVENTOR
JAMES DUNLOP
BY
ATTORNEY

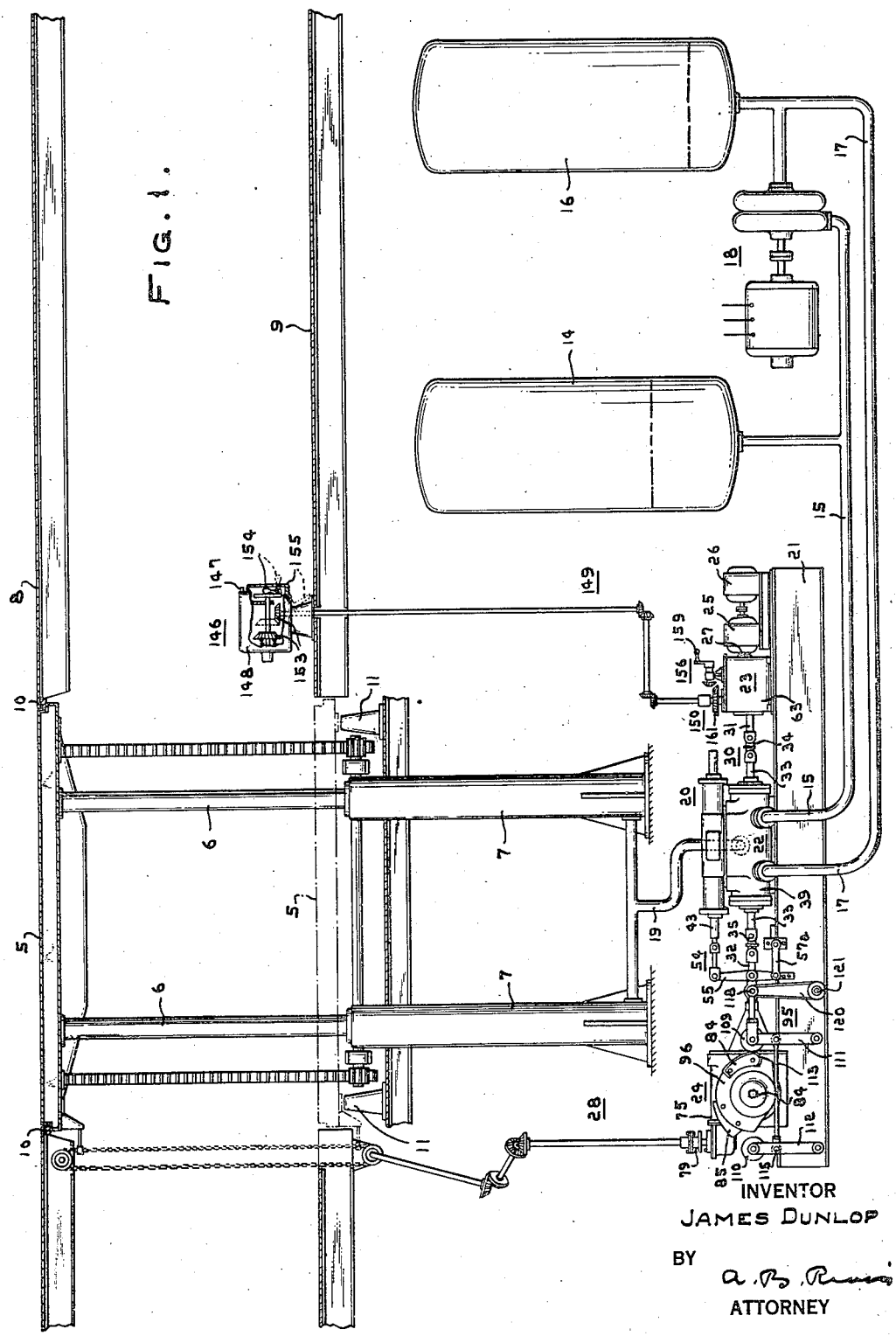

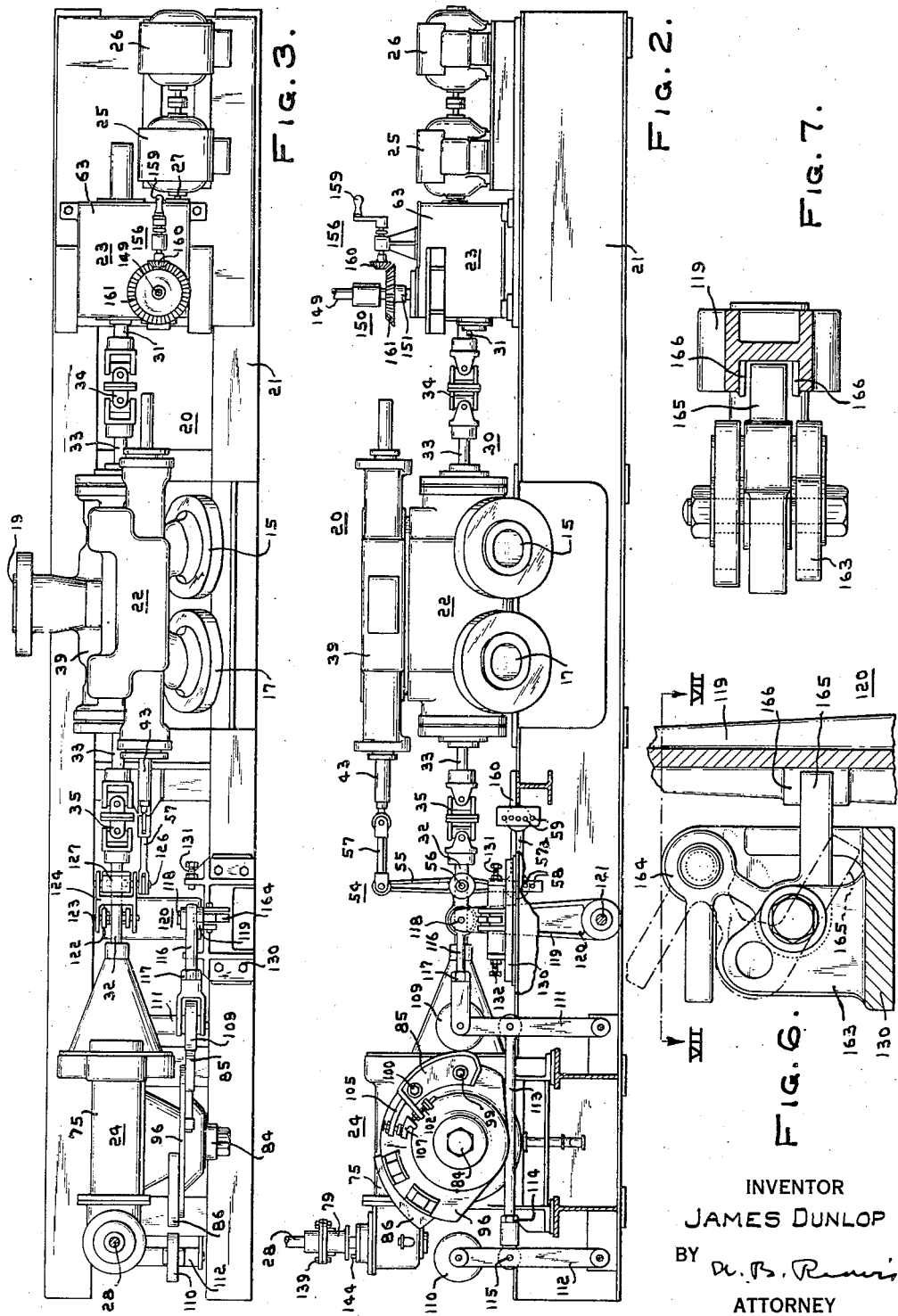

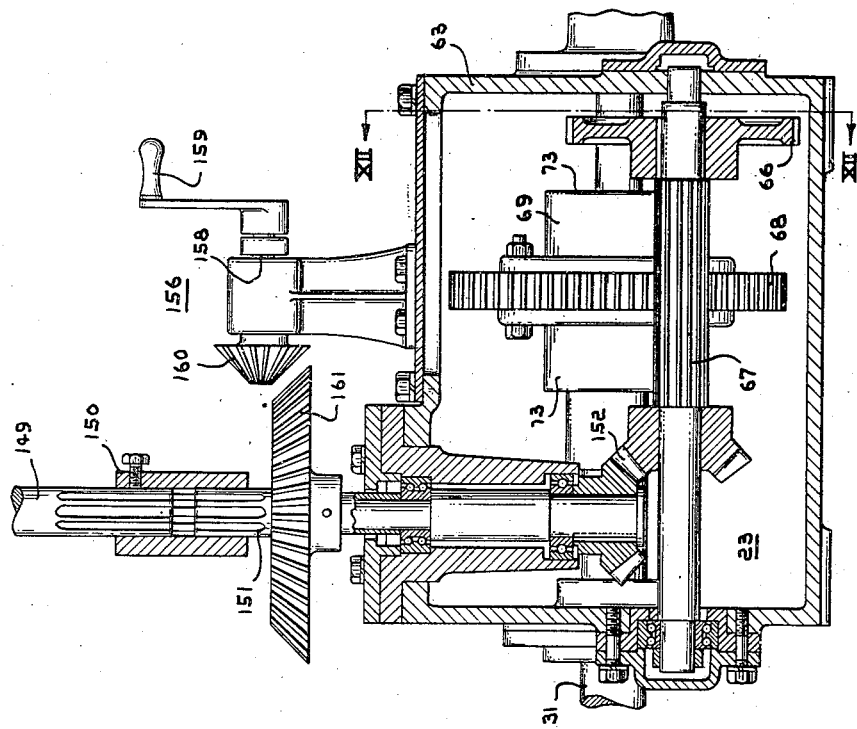
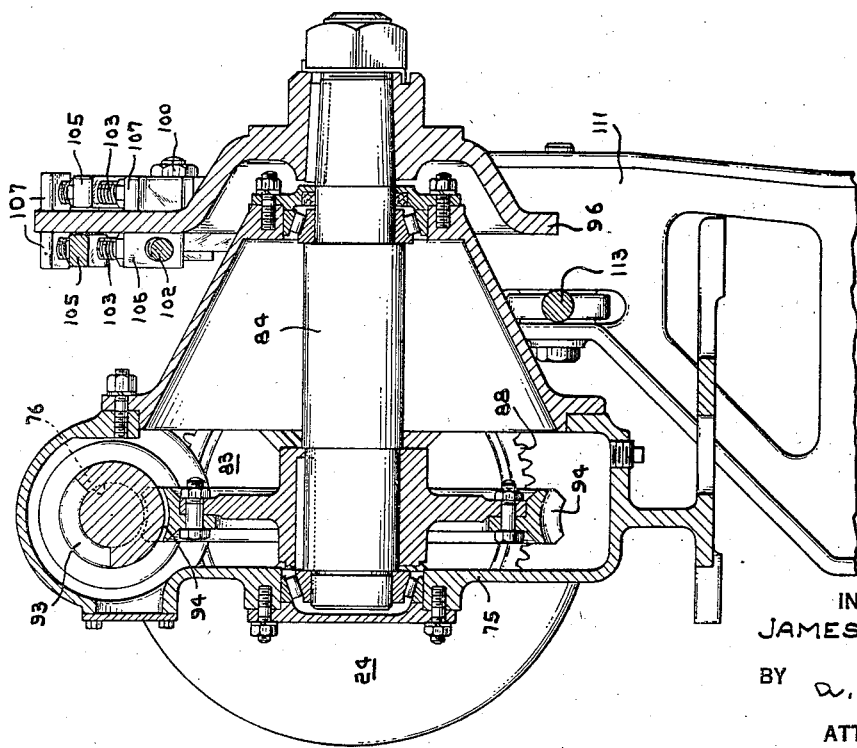

Oct. 15, 1946.   J. DUNLOP   2,409,199
ELEVATOR CONTROL SYSTEM
Filed Jan. 24, 1945   6 Sheets-Sheet 6

INVENTOR
JAMES DUNLOP
BY
ATTORNEY

Patented Oct. 15, 1946

2,409,199

UNITED STATES PATENT OFFICE 2,409,199

ELEVATOR CONTROL SYSTEM

James Dunlop, Ridgewood, N. J., assignor, by mesne assignments, to Westinghouse Electric Corporation, East Pittsburgh, Pa., a corporation of Pennsylvania Application January 24, 1945, Serial No. 574,401

8 Claims. (Cl. 121—41)

The invention relates to hydraulically-operated apparatus, such as disclosed and claimed in my copending application Serial No. 515,992, filed December 28, 1943, for Elevator control systems, and it has for an object to provide valve means movable in response to a pilot motor and to follow-up means operated by the movable component of the elevator and wherein the valve means and the follow-up means are independent of the hydraulic motor means, apart from the necessary piping, with the result that the control arrangement is usable with such motor means irrespective of whether or not the latter is vertical or horizontal and with the result that the hydraulic motor means is not complicated by the provision of features necessitated because of the control means or resulting from the latter being mechanically related in a dependent manner upon the former.

The aircraft carrier elevator disclosed in the application aforesaid is of the deck-edge type in which the platform is arranged to move outboard of the ship and between the hangar and flight decks. The platform is raised and lowered by means of cables connected to a horizontal plunger arranged in a cylinder. The plunger and the cylinder have a valve mechanism unitarily related thereto, such valve mechanism including a pilot motor for rotating the valve shaft and the latter being connected by screw-and-nut gearing to gear mechanism operated by means of a rack carried by the plunger, the arrangement being such that rotation of the valve shaft by the pilot motor tends to move the valve means in an opening direction while rotation of the nut member of the screw-and-nut gearing in response to plunger movement causes the valve shaft to move translatorily to move the valve means in a closing direction, with the result that, upon starting of the pilot motor, the valve moves in an opening direction until the motive liquid flow area is sufficient to produce movement of the plunger to rotate the nut member at the same speed and in the same direction as the valve shaft is being rotated by the pilot motor, whereupon, as the plunger then moves at a speed dependent upon the pilot motor speed, opening movement of the valve means ceases. The plunger is provided with slow-down cams, which are effective, as stroke ends are approached, to move the valve means in a closing direction to obtain rapid deceleration of the plunger and of the elevator so that the latter slows down rapidly and comes to a stop without any substantial shock. Where the elevator is of the inboard type, it is preferable to arrange the cylinder or cylinders and the plunger or plungers vertically underneath the platform so that the plunger or plungers may be connected for directly supporting the latter; and, in order that valve mechanism operated and controlled in the general manner disclosed in said application may be used therewith, it is further necessary to disassociate the valve means and the control mechanism therefor from the plunger or plungers and the cylinder or cylinders so that the valve means and the control mechanism may be dealt with independently, and this requirement necessitates rotary slow-down cams and a special arrangement of follower means operated to move the valve means in a closing direction.

Accordingly, a more particular object of the invention is to provide valve means controlled in response to a pilot motor and to elevator motion together with rotary slow-down cams operated by the elevator for moving the valve means in a closing direction as the platform approaches stop position.

A further object of the invention is to provide, for hydraulically-operated apparatus including a movable component, valve means moved by screw-and-nut members of such steep pitch that one of the members may be forcibly moved axially independently of the motor and of the follow-up means to move the valve means in a closing direction, together with slow-down directional cams rotated by the movable component and effective to move the valve means in a closing direction as stop positions are approached.

Yet another object of the invention is to provide valve mechanism for a hydraulically-operated elevator in which valve means is operated by a pilot motor and by elevator platform follow-up means so that the platform is caused to travel at a speed dependent upon pilot motor speed, together with means providing for disconnection of the follow-up means and for manual control of the valve means.

A further object of the invention is to provide for manual control of an elevator in the manner just described, together with means for limiting the extent to which the valve means may be opened so as to limit the speed of the elevator to a corresponding speed.

These and other objects are effected by the invention as will be apparent from the following description and claims taken in connection with the accompanying drawings, forming a part of this application, in which:

Fig. 1 is a schematic view showing a hydraulically-operated elevator and the improved valve control mechanism associated therewith;

Fig. 2 is a side elevation of the valve control mechanism;

Fig. 3 is a plan view of the apparatus shown in Fig. 2;

Fig. 4 is an enlarged fragmentary view of apparatus shown in Fig. 3;

Fig. 5 is a side elevational view of Fig. 4;

Figs. 6 and 7 are detail views of the latch for limiting the extent of valve motion for manual control;

Fig. 8 is a vertical sectional view of the valve control gear;

Fig. 9 is a sectional view taken along the line IX—IX of Fig. 8;

Fig. 10 is a sectional detail view of the coupling for connecting the platform-operated shafting to the valve control gear;

Figs. 11, 12 and 13 are sectional views of the motor-operated gearing;

Figure 13:
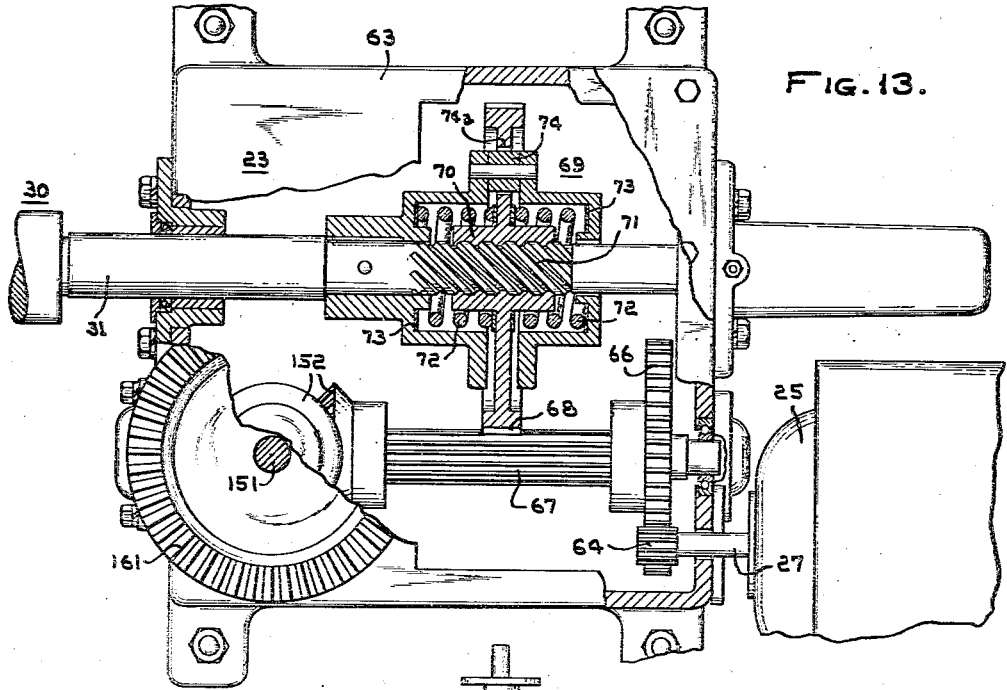

In Fig. 1 of the drawings, there is shown an elevator having a movable component including a platform 5 carried by upper ends of plungers 6 arranged in hydraulic cylinders 7. The platform is movable upwardly to a top position to align with an upper floor or the flight deck 8 of an aircraft carrier, and it is movable to a bottom position to align with the lower floor or hangar deck 9. Alignment of the platform floor with the surfaces of the floors or decks 8 and 9 is secured by "up" and "down" stop abutments 10 and 11, respectively.

The platform is raised and lowered by admitting motive liquid to and discharging such liquid from the cylinders 7. As shown, the liquid pressure system serving this purpose is comprised by a high-pressure side, including the tank 14 and piping 15, and the low-pressure side, including the tank 16 and the piping 17, a motor-operated pump, at 18, being connected between the high and low-pressure side piping. Flow of motive liquid from the high-pressure piping 15 to the cylinder piping 19 and the cylinders 7, for upward travel of the platform, and flow of liquid from the cylinders and through the piping 19 to the low-pressure piping 17, for downward travel of the platform, is controlled by the improved valve control mechanism, at 20.

The valve control mechanism, at 20, includes a bedplate 21 upon which is mounted valve means, at 22, arranged between the motor control gearing, at 23, and the valve control gearing, at 24. The motor control gearing is operated by motor means, preferably including a pair of motors 25 and 26 mounted on the bedplate and having a common drive shaft 27 for the motor control gearing. The valve control gearing, at 24, is operated by the elevator platform by means including the shafting, at 28.

The valve means, at 22, is operated by a valve control shaft, at 30, including outer sections 31 and 32 and an intermediate section 33 connected by the universal joints 34 and 35. The shaft, at 30, is connected to the valve control gearing, at 24, by means of screw-and-nut gearing, at 36, including the meshing screw and nut elements 37 and 38 (Fig. 8). The valve control shaft, at 30, is rotated by the motor control gearing, the outer section 31 of such shaft functioning as the motor control shaft, and one of the elements of the screw-and-nut gearing, for example, the nut element 38, is rotated in response to platform movement, while the screw element 37 is formed on the other outer section 32 of the valve control shaft. Therefore, to start, operation of the motor means is initiated to rotate the valve shaft and relative rotation of the latter with respect to the nut element 38 causes the shaft to move translatorily, in consequence of which the valve means, at 22, is operated to admit liquid to the cylinders 7 or to discharge liquid therefrom for upward and downward travel of the platform, and opening movement of the valve means continues until the nut member rotates with the screw member, at which time the platform has a speed dependent upon the speed of the motor means.

Aside from this differential action of the screw-and-nut gearing, at 36, to control the valve means to cause the elevator to move in a follow-up manner with respect to the pilot motor means, the meshing threads of the screw and nut elements 37 and 38 have such steep pitch that the screw element may be forcibly moved axially by slow-down cams, hereinafter described, to move the valve means in a closing direction, independently of motor means and elevator rotary inputs given to the screw and nut elements, to bring the elevator smoothly and quickly to a stop at top and bottom positions.

In connection with deceleration of the elevator as stop positions are approached in response to valve-closing movement effected by the slow-down cams, as pointed out in the application aforesaid, the electrical energy input to the motor means is reduced about the time that the leading end of a hereinafter-described slow-down cam starts to move the valve means in a closing direction and the energy supply is interrupted altogether, and a brake, effective on the motor means and the motor-operated gearing, at 23, is applied when the elevator nearly reaches top and bottom positions. With the present arrangement, as the slow-down cams are designed and arranged to initiate valve-closing movement when the platform is about forty inches from the stop being approached, the motor energy supply is diminished at about that distance and such supply is interrupted one-quarter of an inch from the stop. The slow-down cams are, however, capable of forcibly moving the shaft, at 30, through the nut to develop torque opposing the torque of the motor means sufficiently to stall and rotate the latter reversely.

Figure 14:
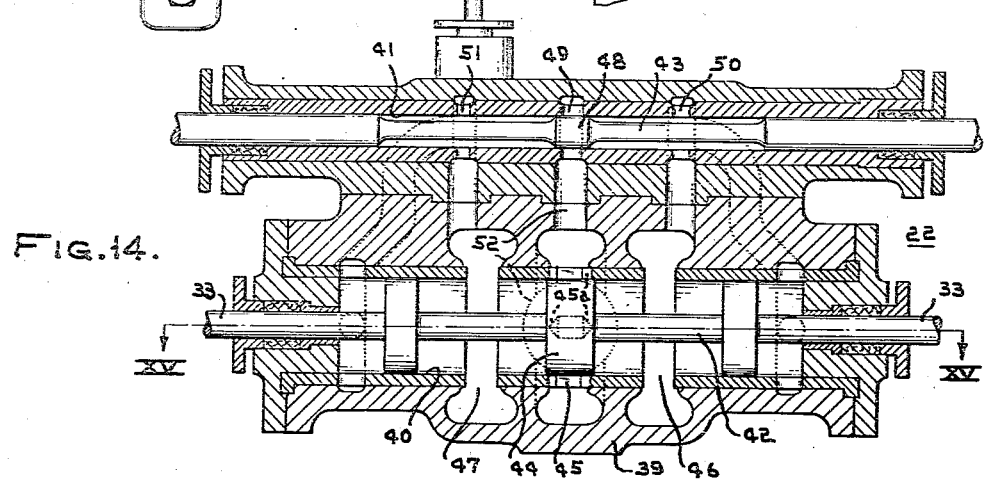
Fig. 14 is a sectional view of the valve means.
Figure 15:
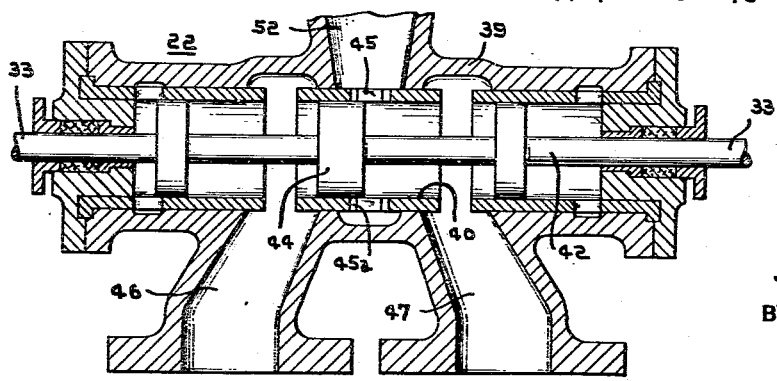
Fig. 15 is a sectional view taken along the line XV—XV of Fig. 14.

The valve means includes a valve body 39 having a main valve cylinder 40 and a leveling valve cylinder 41 with main and leveling piston valves 42 and 43 arranged therein (Figs. 14 and 15). The main piston valve has a land 44 controlling communication of the plunger cylinder ports 45 with the high-pressure port 46 and the low-pressure port 47. In like manner, the leveling valve 43 has a land 48 for controlling communication of the plunger cylinder ports 49 with high-pressure ports 50 and low-pressure ports 51. As shown in Fig. 14, the high and low-pressure ports 50 and 51 of the leveling valve communicate with the high and low-pressure ports 46 and 47, which are connected to the high and low-pressure piping 15 and 17, respectively; and the plunger cylinder ports 45 and 49 for the main and leveling valves are connected by the passage 52 formed in the valve body and which communicates with the piping 19.

The leveling piston valve 43 is reciprocated by means, at 54, operated by the main valve shaft, at 30.

As disclosed and claimed in the application aforesaid, the main piston valve ports 45 have tapered ends 45a to provide for flow at an increasing rate as such ports are uncovered for rapid acceleration of the plungers and the platform for starting. With the platform engaging either the "up" or "down" stops, the main piston valve land 44 is arranged to lap the ports 45 with the leveling piston valve land partially closing its plunger cylinder ports 49 to the high-pressure ports 50, when the platform is at its top position, and partially closing the plunger cylinder ports to the low-pressure ports 51, when the latter is at its bottom position, whereby the leveling valve serves to by-pass the main valve to furnish high pressure to sustain the elevator in its top position and to provide for low pressure sustaining part of its load when in bottom position.

The relative movements of the main and leveling piston valves should be such that, with the platform in either its top or bottom position and with the main piston valve moving in lapping relation with respect to its plunger cylinder ports 45, the leveling piston valve may move from a position affording partial communication between its plunger cylinder ports 49 and either its high-pressure or low-pressure ports 50 and 51 to a position affording partial communication of such plunger cylinder ports with the other of the latter to provide for valve reversing operation necessary in starting the elevator either upwardly or downwardly from stop positions.

To provide for valve movements of the above character, the mechanism, at 54, comprises a lever 55 pivoted, at 56, to the valve shaft, at 30, the lever having its upper end pivotally connected by a link 57 to the leveling piston valve 43 and having, at its lower end, a floating fulcrum provided by the fulcrum link 57a. To adjust the ratio of movement ranges of the main and leveling piston valves, the lever 55 is provided with a series of openings 58 arranged in opposed relation with respect to a series of openings 59 provided on the bracket 60 carried by the bedplate 21, the ends of the fulcrum link being pivotally connected in any of the opposed pairs of the openings 58 and 59 for this purpose. To adjust the movement range of the leveling valve land 48 in relation to the plunger cylinder ports 49, the leveling piston valve 43 has an adjustable thread connection, at 61 (Fig. 5), by means of which, due to turning of the piston valve relative to the link 57, the movement range of such valve may be varied.

The motor control gearing, at 23, is substantially the same as that disclosed and claimed in my application aforesaid, the gearing comprising a casing 63 mounted on the bedplate 21, a pinion 64 (Fig. 13) carried by the motor shaft 27 and meshing with the gear 66 connected to the long pinion 67, which meshes with the gear 68 connected by the coupling, at 69, to the valve control shaft section 31 which extends into the motor control gear casing to constitute the motor control shaft. The gearing provides for rotation of the valve shaft, at 30, by the motor means, and, if such shaft rotates relative to the nut element 38, it will be apparent that it will be moved translatorily or axially. The long pinion accommodates such axial movement.

Furthermore, as will be hereinafter pointed out, the valve shaft, at 30, is forcibly moved axially to move the valve means in closing directions as top and bottom stop positions are approached, and, unless the nut element 38 rotates so as to accommodate axial movement of the shaft without rotation of the latter, such forcible axial movement of the control shaft will produce rotational movement thereof; and, if, as pointed out in my application aforesaid, the motor-operated gearing is restrained by means of a brake, then it will be necessary to accommodate such angular movement.

Therefore, the coupling, at 69, includes a hub 70 formed on the gear 68 and having a helically-splined connection 71 with respect to the shaft, at 30, and of the same pitch and direction as the screw-and-nut gearing. Springs 72 have their inner ends bearing against opposite sides of the gear and have their outer end engaging abutments provided by the housing 73 attached to the valve control shaft outer section 31 and which have stops 74 arranged in arcuate slots 74a formed in the gear web to limit the extent of relative angular movement of the valve control shaft and the gear (Fig. 12). With axial movement of the valve control shaft, at 30, and incidental rotary movement thereof due to the action of the screw-and-nut gearing, such movement is accommodated by the helically-splined connection of the coupling, at 69, such rotational movement of the shaft relative to the driven gear taking place with compression of the springs 72 and to the extent permitted by the stops and slots. The springs serve a centering function in that energy stored therein due to relative movement of the valve control shaft and gear is effective to center the gear and restore the relative positions of the latter and the control shaft as the opposing effort is reduced.

As pointed out in my application aforesaid and in my application Serial No. 514,519, filed December 16, 1943, for Gear mechanism, to which reference should be made for a more extensive description of the structure and operation of the gear coupling, such coupling, at 69, functions to absorb shocks as between the shaft, at 30, and the gear 68 and to permit of whatever angular movement of the shaft may be involved incident to valve-closing translatory movement thereof by the slow-down cams.

Referring to Fig. 8, the valve control gearing, at 24, is housed by a gear casing structure 75, the gearing including a drive shaft 76 carried by bearings 77 and 78 supported by the casing. The shafting, at 28, rotated by platform movement, includes a coupling, at 79, for connecting and disconnecting a lower section 80 connected by beveled gearing 81 to the drive shaft 76. The drive shaft is connected by reduction gearing, at 82, to the driven member 89, aligned with the valve control shaft, at 30, and by reduction gearing, at 83, having a higher ratio of speed reduction, to the rotary member or shaft 84, provided with directional slow-down "up" and "down" cams 85 and 86. The cams are of such length that the travel of the cam surface corresponds to a travel of the platform of about forty inches so that the platform is about that distance from a stop position.

The reduction gearing, at 82, includes a drive shaft pinion 87 meshing with a gear 88 attached to one end of the tubular member or shaft 89 and providing the nut element 38 at its other end. Bearings 90 and 91, aside from holding the driven or tubular member against axial movement, support such member in parallel relation to the drive shaft; and, by means of said member, provide support both for the gear 88 and the screw element 37 of the section 32 of the valve control shaft, at 30.

The reduction gear, at 83, includes a worm 93 formed on the drive shaft 76 and meshing with the worm gear 94 carried by the rotary member or cam shaft 84, such worm gearing providing both for suitable speed reduction and for arrangement of the axis of the cam shaft 84 at right angles to the drive shaft to relate properly the "up" and "down" cams 85 and 86 to the follower mechanism, indicated generally, at 95, for operating the valve means.

The rotary member or cam shaft 84 has a disc member 96 upon which the cams 85 and 86 are mounted. The disc has arcuate slots 97 and 98 for bolts 99 and 100 connecting each cam to the disc, the bolt 99 fitting a pivot opening arranged at the rearward portion of each cam and the bolt 100 fitting a radial slot 101 formed in each cam at the forward end portion thereof. With positioning of the bolts 99 along the slots 97 incident to positioning of the cams relative to the cam disc, such bolts are firmly locked in place with respect to the cam disc to permit of pivotal movement of the cams about such bolts to the extent permitted by the bolts 100 and the radial slots 101. Each cam is provided with tangent and radial screws 102 and 103 threaded to lugs 104 and 105 and having their ends fitting between opposed abutments 106, 106 and 107, 107 formed on the cam disc. With the bolts 99 and 100 of each cam loosened, the screw 102 may be turned to position the cam circumferentially with respect to the cam disc, whereupon the pivot bolt 99 is firmly locked in position with respect to the cam disc, and, by turning the screw 103, the forward end of the cam may be moved inwardly or outwardly to adjust the cam lift surface to a desired extent, whereupon the associated bolt 100 is tightened.

To enable a substantial portion of a revolution of the cam shaft 84, for example, 270 degrees, to be used for each elevator trip without each cam interfering with the follower element of the other cam, the "up" and "down" cams 85 and 86 are located at opposite sides of the cam disc 96 so as to be laterally offset or be in spaced rotational planes of the cam shaft (Figs. 3 and 4), and the cooperating "up" and "down" follower rollers or elements 109 and 110 are correspondingly laterally offset.

The "up" and "down" follower rollers 109 and 110 are carried at the upper ends of the "up" and "down" rocker levers 111 and 112 connected by a link 113, including a threaded coupling 114 for adjusting its length, and provided with means, for example, the pivot pin coupling 115, with the "down" lever 112 providing for disconnection of the levers.

A link 116, provided with means, at 117, by which its length may be varied, is connected at one end to the "up" rocker lever 111 and at its other end, by means of a removable pivot pin 118, to one arm 119 of the U-shaped intermediate rocker lever, at 120, pivoted, at 121, and having its other arm 122 of double or bifurcated formation for straddling the valve control shaft, at 30, and connected by pivots 123, 123 to the link structure 124, also straddling or encompassing the valve control shaft and having pivotal relation with respect to the oppositely-extending pivot pins 125 and 126 formed on the swivel housing 127 connected by the combined radial and thrust bearing 128 to the valve control shaft, at 30. The pivot pin 126 connects the valve control shaft, at 30, to the lever 55. By the use of the swivel, freedom of the valve control shaft for rotation is preserved while, at the same time, it is reciprocated due to oscillatory movements of the intermediate rocker lever, at 120, effected by the cams.

To provide for valve operation by the "up" and "down" slow-down cams 85 and 86 to decelerate the elevator platform in the desired manner as upper and lower stop positions are approached, requires the proper setting of the valves, the follower mechanism, the cams, and the valve control shaft section 31, constituting the motor control shaft, relatively and in relation to the elevator platform.

The cams should be so set that, with the platform in upper and lower stop positions, the high points thereof will be in the line of centers of the cam shaft and the follower roller 109, when the platform is at the upper stop position, and in the line of centers of such cam shaft and the follower 110, when the platform is at the lower stop position; and the roller clearances should be adjusted for deceleration of the platform as stop positions are approached so that the platform will be stopped by the stop abutments 10 and 11 with little or no shock. Furthermore, stops should be provided to limit motion of the follower mechanism to avoid the possibility of overtravel of the latter and collision of the back ends of the cams with their follower rollers.

To limit motion of the follower mechanism for the purpose just mentioned, a bracket plate 130 is attached to the platform 21 and it has opposed stop screws 131 and 132 cooperating with the arm 119 of the intermediate rocker lever, at 120, to limit the range of movement of the later. Assuming that the arm 119 is vertical for a neutral position of the valve means, then the "up" stop screw 131 should bet set for a clearance corresponding to the flow area of the valve means for upward travel of the platform with maximum load. Likewise, the "down" stop screw 132 should be set for a valve means flow area for downward travel of the platform fully loaded.

Referring now to setting of the valves, the follower mechanism, the motor control shaft and the cams in relation to elevator travel, with the intermediate rocker lever, at 120, blocked in a predetermined position, for example, vertical, the universal joint assemblies, at 34 and 35, are disconnected by the removal of connecting bolts 133, and both the valves and the valve control shaft section 31, functioning, as shown, as the motor control shaft, are adjusted to be in neutral positions, whereupon the universal joint assemblies are re-connected, shims 134 being inserted or removed to provide for re-connection with the intermediate rocker lever, at 120, with the valves and the motor control shaft so positioned.

With the main piston valve 42 in neutral or mean cut-off position, the leveling piston valve 43 is adjusted for neutral position by operation of the threaded connection 61 secured by turning of the leveling piston valve. Next, the U-shaped intermediate rocker lever, at 120, is preferably unlocked and the latter is moved manually for positioning the "up" and "down" stop screws 131 and 132, the "down" screw being set for larger travel from neutral than the "up" screw. In several installations, the "up" screw has been set for travel of one and one-half inches of the main piston valve 42 to the right of neutral and the "down" screw 132 for a travel of two and one-quarter inches to the left of neutral.

To adjust the cams and the follower rollers, the valves are returned to neutral by hand, the "up" and "down" follower rocker levers 111 and 112 are disconnected by the removal of the pivot pin 115, the "up" lever 111 is disconnected from the intermediate rocker lever, at 120, by removal of the pivot pin 113, the rocker levers 111 and 112 are locked slightly off vertical position to insure clearance of the cams and their follower rollers, and the liquid pressure is turned on.

By manual control, as hereinafter described, the elevator platform is brought slowly to the flight deck 8 and against the stops 10, whereupon the platform is locked in that position by suitable means (not shown) and the main piston valve is brought to neutral position. The "up" cam 85 is now centered, by turning its tangent screw 102, with respect to the cam disc slots 97 and 98 therefor and its pivot pin 99 is locked in that position. The "up" rocker lever 111 is locked in the vertical and the spline coupling, at 79, is disconnected to provide for movement of the valve control gearing, at 24, by hand to bring the high point of the "up" cam 85 on the centerline of the roller 109, after which, pursuant to turning of the radial screw 103 for adjustment of the forward end of the cam inwardly toward the cam shaft axis or outwardly therefrom for full use of the cam lift surface, the bolt 100 is locked and the coupling is re-connected. The "up" rocker lever 111 is then unlocked, and, with the cam roller spaced a predetermined distance from the cam disc periphery, the link 116 is connected to the intermediate rocker, at 120, by insertion of the pivot pin 113, the length of the link being suitably adjusted by operation of the connection 117.

With the platform unlocked, it is lowered a suitable distance under hand control and it is then raised to bring the platform against the "up" stop 10. The "up" cam should take control for a smooth stop; and, if there is a slight shock, the clearance of the roller is slightly reduced by increasing the length of the link 116.

Adjustment of the "down" cam and its cooperating follower roller is effected by procedure which is similar in most respects to that just described in connection with the "up" cam and its follower roller. After the platform is brought, by manual control, into engagement with the "down" stops 11, the "down" roller lever 112 is unlocked and the "down" cam is adjusted by loosening the bolts 99 and 100 and adjusting the tangent screw 102 to bring the high point of the cam to the centerline of the "down" roller 110, the latter and its rocker lever 112 being held vertically manually, and the pivot bolt 99 and the adjusting screw 102 are then locked. Next, the "down" roller is set for the same predetermined clearance with respect to the cam disc periphery as was used for the "up" roller and the link 114 is connected to the "down" rocker lever 112 by insertion of the pivot pin 115, the length of the link 113 being varied to suit, by operation of the connection 114. If, with the elevator under manual control, the "down" cam should not take control for a smooth stop, the roller clearance is reduced by adjusting the length of the link 113.

Referring to the spline coupling, at 79, and to the aforesaid manual operation of the valve control gearing in setting the "up" cam, the coupling is comprised by coupling members 135 and 136 having flanges 137 and 138 connected by bolts 139. The coupling member 135 is keyed to the shaft 28 rotated in response to platform movement and the coupling member 136 has interior splines which interfit with splines 140 provided on the lower shaft section 80. The splined coupling member 136, upon removal of the connecting bolts 139, is moved downwardly by a compression spring 141 to engage any one of the circular series of openings 142 formed in the lower flange 143 with the locking pin 144 carried by the housing structure 75 of the valve control gearing and serving the purpose hereinafter described. After disconnection of the coupling, at 79, and with the lower flange 143 above the top end of the stop pin 144, the coupling member may be grasped manually to turn the cam shaft incident to setting of the "up" cam 85 in the manner described.

Normally, the elevator is controlled from a station, at 146, located at the hangar deck and providing for automatic and manual control. The station has push buttons 147 effective to initiate operation of the motor means for upward and downward travel of the elevator, as disclosed more fully in my application Serial No. 515,992, aforesaid. Also, as disclosed in said application, the station includes a housing 148 into which extends the upper end of shafting, at 149, whose lower end is connected by the clutch, at 150, to the shaft section 151 (Fig. 11) extending into the motor control gear casing 63 and connected by beveled gearing 152 to the long pinion 67 of the motor-operated gear train.

As disclosed in the aforesaid application Serial No. 515,992, the housing 148 encloses a brake interlocked with the motors 25 and 26 and effective to prevent rotation of the shafting, at 149, and, therefore, the motor-operated gearing, when the energy supply circuit for the motors 25 and 26 is interrupted. Such housing also encloses a switch for the motor supply circuit and beveled gearing 153 by means of which a hand crank 154 is connected to drive the shafting, at 149, the arrangement being such that, when the door 155 of the housing is opened, the handle 154 is rendered accessible, the normally disengaged gears 153 are engaged, the motor switch is opened, and the brake is released; and, upon closing of the door, the handle is rendered inaccessible, the gears are disengaged, the motor switch is closed, and the brake is applied.

Aside from the hangar deck control station providing for alternative automatic and manual control and because it is located where the operator has a full view of the platform as it nears stop positions, the manual feature is usable to control operation if, for any reason, the elevator follow-up mechanism, at 28, becomes ineffective, in which event, the coupling, at 79, is disconnected and the spring 141 then moves the splined coupling member 136 downwardly to engage one of the openings 142 about the stop pin 144 to lock the valve control gearing, at 24, whereupon the elevator may be controlled manually from the hangar deck station, at 146, the operator being careful to slow down manual turning of the crank 154 as stop positions are approached to avoid excessive impact of the platform with the stops.

In addition to the manual control station 146 at the hangar deck, a manual control station, at 156, is provided adjacent to the motor control gearing, at 23, and such station is comprised by a shaft 158 supported by the motor control casing 63 and having, at one end, a hand crank 159 and, at its other end, a beveled pinion 160 to mesh with the beveled gear 161 carried by the shaft section 151. Normally, the shaft 158 occupies the position shown in Figs. 1 and 11, the pinion 160 being disengaged from the gear 161. Upon disconnection of the clutch 150 and with the pinion 160 meshing with the gear 161, the valve control shaft, at 30, may be turned manually for upward and downward travel of the elevator, the slow-down cams and the follower mechanism remaining effective to bring the platform smoothly to a stop at its stop positions, as already described.

So long as the elevator follow-up means remains effective to operate the slow-down cams, deceleration is thereby provided for irrespective of continued turning of the hand crank without regard to platform position; however, as the operator's view, at the station 156 of the platform as it approaches stop positions, is obscured, other means must be provided to guard against excessive platform impact with the stops in the event that the follow-up means is ineffective and, to this end, there is provided means to limit the maximum extent of opening of the valve means to that for a speed of the platform such that the motion of the latter may be arrested by the stops without excessive impact. Valve travel is limited for this purpose, upon uncoupling the follower mechanism by the removal of the pin 118, by means limiting the range of movement of the rocker lever, at 120, such means comprising a bracket 163 attached to the bedplate 21 and provided with a pivoted latch member 164 having a toe 165 movable manually into the space between the opposed abutments 166 formed on the arm 119 of the rocker, at 120. Normally the latch occupies a disengaged position, as shown in dot-and-dash lines in Fig. 6. With the toe disposed in the space between the abutments, there exists sufficient clearance for operation of the leveling or vernier valve for the desired creeping speed of the platform. The manual control station, at 156, is useful in setting various parts for the desired timing, as above pointed out, and also to preserve maintenance of control in the event of failure of the hangar deck station, at 146, or its connections and failure of such station and the elevator follow-up means, this being particularly desirable to restore the platform to a position closing the flight deck hatch opening.

From the foregoing, it will be apparent that I have devised valve control mechanism which is useful with hydraulically-operated elevators irrespective of the disposition of the plunger cylinder or cylinders, this result being accomplished by providing mechanism which is structurally and functionally independent of the hydraulic cylinder or cylinders and the plunger or plungers therein and by having a pair of rotary directional cams incorporated in the mechanism and operated by suitable means responsive to elevator movement. By having such an independent arrangement of control mechanism, it becomes feasible to use the control system disclosed and claimed in my application aforesaid in connection with aircraft carrier elevators of the inboard type and which use vertical plungers and cylinders. With such an installation of the elevator, the main control station is usually located on the hangar deck, such station incorporating means providing for automatic or manual control of the elevator. In the event that the follow-up arrangement between the elevator and the valve control gearing, including the cam shaft, should be damaged for any reason, then, as the operator commands a full view of the elevator platform as it approaches upper and lower stop positions, he is able to observe the elevator as it approaches such positions and to slow down its motion accordingly to avoid excessive impacts; and, in order that the valve control gearing may be disconnected from the means operated by the elevator for rotating the drive shaft thereof, the spline clutch, at 79, is disconnected, the lower member thereof moving downwardly to engage the lock pin 144, whereupon the drive shaft 76 and the valve control gearing is held in position against movement. Should the pilot motor means fail for any reason, then the elevator may be controlled manually from the hangar deck control station or from the station adjacent to the pilot motor gearing.

In the event that the elevator follow-up transmission, at 28, should fail or be damaged or ineffective, then, with the pilot motor means out of commission, the operator may control the elevator manually by operation of the hand crank 159, the coupling pin 118 between the link 116 and the rocker lever, at 120, being removed and the latch 164 being operated to bring its toe 165 into position between the abutments 166 of the lever arm 119, thereby restricting opening movement of the valve means for operation of the elevator at a speed not in excess of a creeping speed. Thus, it will be apparent that the control mechanism remains effective to control the elevator irrespective of battle damage to features essential to normal control.

Furthermore, the control arrangement is constructed and arranged to facilitate manufacture and assembly and timing of the various components in relation to elevator travel. To provide for the valve means and the control shaft section 31, functioning as the motor control shaft, to be positioned in neutral, the control shaft is provided with universal joints 34 and 35 which are disconnected, whereupon the valves and the shaft section may be moved manually to the desired positions. With the rocker lever locked in the vertical, the universal joints are re-connected, shims 134 being inserted or removed to the extent necessary to provide for connection without disturbing the positions of the valve means and of the motor control shaft in neutral. Thereafter, with the elevator in "up" position, the "up" slow-down cam is adjusted circumferentially to bring its high point to the centerline of the roller 109 and the cam is adjusted radially so that the lift surface thereof is fully effective. After adjusting the cam 85, then the rocker lever 111 and the roller 109 are adjusted in relation to the cam for such clearance that the valve means is operated to effect a smooth stop at the top position, the link 116 having its length adjusted for this purpose and the coupling pin 118 being inserted to connect it to the rocker lever, at 120. Next the "down" follower roller 110 and its rocker lever 112 and the "down" cam 86 are adjusted so that the high point of the cam is at the centerline of the roller and the roller has such clearance as to produce smooth stopping at the bottom position, the link 113 having its length suitably varied to provide for the latter operation and it being connected to the lever by the removable pin 115. To provide for a range of operation of the valve means suitable for up and down travel and at the same time to avoid the possibility of the follower mechanism interfering with back ends of the slow-down cams, stop means is provided for the U-shaped intermediate lever, at 120, the stop screws 131 and 132 preferably being adjusted for full load travel prior to adjusting the cams and the cam rollers, as just pointed out.

The leveling or vernier piston valve is adjustable in relation to the main piston valve by turning the vernier valve to effect screw adjustment at the connection 61, the ratio of main piston valve and leveling valve travels may be varied by connecting the fulcrum link 57a in the desired pair of opposed openings, and the movement range of the vernier valve with respect to its plunger cylinder openings may be varied by adjusting the leveling valve at 61. Thus, it will be seen that all of these features contribute to the assembly of an arrangement with the parts all correctly related for satisfactory operation in handling very large loads at relatively high speeds of travel and with effective and smooth acceleration at the beginning of each trip and deceleration at the end thereof.

While the invention has been shown in but one form, it will be obvious to those skilled in the art that it is not so limited, but is susceptible of various changes and modifications without departing from the spirit thereof.

What is claimed is:

1. In a hydraulically-operated elevator having a movable component including a platform movable between upper and lower stop positions and operatively connected to plunger means arranged in cylinder means, reversible pilot motor means, a drive shaft rotatable by the movable component, a valve control shaft, means for transmitting motion from the pilot motor means to the valve control shaft and constructed and arranged to provide for axial movement of the latter, a driven member, a cam shaft, gearing connecting the drive shaft and the driven member and connecting the drive shaft and the cam shaft, screw-and-nut gearing connecting the driven member and the valve control shaft and including screw and nut elements having meshing threads of such steep pitch that the valve control shaft may be forcibly moved axially independently of rotary motion imparted thereto by the pilot motor means and of rotary motion imparted to the driven member from the drive shaft, valve means for controlling the flow of motive liquid into the cylinder means for upward travel of the platform and out of the cylinder for downward travel thereof and movable in response to axial movement of the valve control shaft such that rotation of the latter by the motor means causes the valve means to move in an opening direction and rotation of the driven member causes the valve means to move in a closing direction to provide a flow area sufficient for movement of the platform at a speed dependent upon that of the pilot motor means, follower mechanism movable with the valve control shaft as the latter moves axially and including follower elements, and a pair of directional cams carried by the cam shaft and cooperating with the follower elements to operate the follower means for movement of the valve control shaft axially to move the valve means in a closing direction for decelerating the movable component as the platform approaches stop positions.

2. Apparatus as claimed in claim 1 wherein the cams and the follower elements are laterally offset to avoid interference of each cam with the follower element of the other cam.

3. Apparatus as claimed in claim 1 with means providing for circumferential adjustment of each cam about the cam shaft axis and including a pivot for the rearward portion thereof, and means for adjusting the forward portion of each cam inwardly toward the cam shaft axis or outwardly therefrom to vary the lift.

4. In a hydraulically-operated elevator having a movable component including a platform movable between upper and lower stop positions and operatively connected to plunger means arranged in cylinder means, reversible pilot motor means; a drive shaft rotatable by the movable component; a control valve shaft comprising first and second outer sections, an intermediate section, and couplings connecting the sections and each coupling including means providing for variation in its length so that the sections may be positionally varied relatively in an axial direction; gearing operated by the pilot motor means and including a long pinion meshing with a driven gear coaxial with said valve control shaft first section; a coupling between said driven gear and said first section and constructed and arranged to provide for a limited amount of relative angular movement of the section and the gear against centering springs acting on the latter; a driven member; a cam shaft; gearing connecting the drive shaft and the driven member and connecting the drive shaft and the cam shaft; screw-and-nut gearing connecting the driven member and the second outer section of the valve control shaft and including screw and nut elements having meshing threads of such steep pitch that the valve control shaft may be forcibly moved axially independently of rotary motion imparted thereto by the pilot motor means and of rotary motion imparted to the driven member from the drive shaft; valve means for controlling the flow of motive liquid into the cylinder means for upward travel of the platform and out of the cylinder means for downward travel thereof and connected to move axially with the intermediate section of the valve control shaft such that rotation of the latter by the motor means causes the valve means to move in an opening direction and rotation of the driven member causes the valve means to move in a closing direction to provide a flow area sufficient for movement of the platform at a speed dependent upon that of the pilot motor means; and follower mechanism movable with the valve control shaft as the latter moves axially and including a pair of follower rollers; a pair of laterally offset directional cams carried by the cam shaft and cooperating with the follower rollers which are correspondingly laterally offset to operate the follower mechanism for movement of the valve control shaft to move the valve means in a closing direction for decelerating the movable component as the platform approaches stop positions; means providing for circumferential adjustment of each cam about the cam shaft axis and including a pivot for the rearward portion thereof and means for adjusting the forward portion of each cam inwardly toward the cam shaft axis or outwardly therefrom to vary the lift; said follower mechanism including a pair of first and second rocker levers carrying the follower rollers, a first link means of variable length connecting said rocker levers and including a removable pivot pin to provide for disconnection of the latter, an intermediate rocker lever, second link means of variable length connecting said second rocker lever and the intermediate rocker lever and including a removable pivot pin providing for disconnection thereof from the intermediate rocker lever, a swivel mounted on the second outer section of the valve control shaft and movable axially therewith, and link means connecting the intermediate lever and the swivel.

5. Apparatus as claimed in claim 4 with adjustable stops cooperating with the intermediate rocker to limit the range of movement thereof.

6. In a hydraulically-operated elevator having a movable component including a platform movable between upper and lower stop positions and operatively connected to plunger means arranged in cylinder means, reversible pilot motor means; a drive shaft rotatable by the movable component; a valve control shaft comprising first and second outer sections, an intermediate section, and couplings connecting the sections and each coupling including means providing for variation in its length so that the sections may be positionally varied relatively in an axial direction; gearing operated by the pilot motor means and including a long pinion meshing with a driven gear coaxial with said valve control shaft first section; a coupling between said driven gear and said first section and constructed and arranged to provide for a limited amount of relative angular movement of the section and the gear against centering springs acting on the latter; a driven member; a cam shaft; gearing connecting the drive shaft and the driven member and connecting the drive shaft and the cam shaft; screw-and-nut gearing connecting the driven member and the second outer section of the valve control shaft and including screw and nut elements having meshing threads of such steep pitch that the valve control shaft may be forcibly moved axially independently of rotary motion imparted thereto by the pilot motor means and of rotary motion imparted to the driven member from the drive shaft; valve means for controlling the flow of motive liquid into the cylinder means for upward travel of the platform and out of the cylinder means for downward travel thereof and connected to move axially with the intermediate section of the valve control shaft such that rotation of the latter by the motor means causes the valve means to move in an opening direction and rotation of the driven member causes the valve means to move in a closing direction to provide a flow area sufficient for movement of the platform at a speed dependent upon that of the pilot motor means; follower mechanism movable with the valve control shaft as the latter moves axially and including a pair of follower rollers; a pair of directional cams carried by the cam shaft and cooperating with the follower rollers to operate the follower mechanism for movement of the valve control shaft to move the valve means in a closing direction for decelerating the movable component as the platform approaches stop positions; said follower mechanism including a pair of first and second rocker levers carrying the follower rollers, first link means of variable length connecting said rocker levers, an intermediate rocker lever, second link means of variable length connecting said second rocker lever and the intermediate rocker lever and including a removable pivot pin providing for disconnection thereof from the intermediate rocker lever, a swivel mounted on said second outer section of the valve control shaft and movable axially with the latter, and link means connecting the intermediate rocker lever and the swivel; manually-operable means normally disconnected with respect to the motor-operated gearing and connectable in driving relation with respect thereto for rotating the valve control shaft manually with said intermediate rocker lever uncoupled from the second link means; and normaly ineffective means for limiting motion of the intermediate rocker lever to limit the extent of opening of the valve means for movement of the elevator at a creeping speed and including a member which is manually movable to render it effective pursuant to disconnecting the intermediate rocker lever from said second link means.

7. In a hydraulically-operated elevator having a movable component including a platform movable between upper and lower stop positions and operatively connected to plunger means arranged in cylinder means, an axially-movable valve control shaft; valve means responsive to axial movement of the valve control shaft to control the flow of motive liquid into the cylinder means for upward movement of the platform and out of the cylinder means for downward movement thereof; reversible pilot motor means; transmission means connecting the pilot motor means and the valve control shaft and including a long pinion meshing with a gear to provide for axial movement of the valve control shaft relative to the pilot motor means; a drive shaft; means operated in response to movement of the movable component for rotating the drive shaft and including a coupling comprising a pair of normally connected coupling members; a driven member aligned with the valve control shaft and parallel to the drive shaft; a cam shaft having its axis disposed at right angles to the axes of the drive shaft and of the driven member; a pinion connected to the drive shaft and meshing with a gear connected to the driven member; a worm provided on the drive shaft and meshing with a worm wheel connected to the cam shaft; screw-and-nut gearing connecting the valve control shaft and the driven member and including meshing screw and nut elements provided thereon and utilizing rotary movement applied to the valve shaft by the pilot motor means and rotary movement applied to the driven member to move the valve control shaft axially to move the valve means such that controlling means rotary movement causes movement of the valve means in an opening direction and driven member rotary movement causes movement thereof in a closing direction to provide a flow area for motive liquid sufficient to move the platform at a speed and in a direction dependent upon the speed and direction of the pilot motor means; the threads of said meshing screw and nut elements having such steep pitch that the valve control shaft may be forcibly moved axially independently of rotary movements applied to the driven member and to the valve control shaft; follower mechanism operatively connected to the valve control shaft for movement therewith as the latter moves axially; a pair of directional cams carried by the cam shaft and operating the follower mechanism to move the valve means in a closing direction as stop positions are approached; means normally disconnected and manually connectable and operable to drive said transmission means to rotate the valve control shaft manually; and means utilizing one of the coupling members of said coupling upon disconnection of the coupling to lock the drive shaft against angular movement.

8. In a hydraulically-operated elevator having a movable component including a platform movable between upper and lower stop positions and operatively connected to plunger means arranged in cylinder means, an axially-movable valve control shaft; valve means responsive to axial movement of the valve control shaft to control the flow of motive liquid into the cylinder means for upward movement of the platform and out of the cylinder means for downward movement thereof; reversible pilot motor means; transmission means connecting the pilot motor means and the drive shaft and including a long pinion meshing with a gear to provide for axial movement of the valve control shaft relative to the pilot motor means; a drive shaft; means operated in response to movement of the movable component for rotating the drive shaft and including a coupling comprising a pair of normally connected coupling members; a driven member aligned with the valve shaft and parallel to the drive shaft; a cam shaft having its axis disposed at right angles to the axes of the drive shaft and the driven member; a pinion connected to the drive shaft and meshing with a gear connected to the driven member; a worm provided on the drive shaft and meshing with a worm wheel connected to the cam shaft; screw-and-nut gearing connecting the valve control shaft and the driven member and including meshing screw and nut elements provided thereon and utilizing rotary movement applied to the valve shaft by the pilot motor means and rotary movement applied to the driven member to move the valve control shaft axially to move the valve means such that controlling means rotary movement causes movement of the valve means in an opening direction and driven member rotary movement causes movement thereof in a closing direction to provide a flow area for motive liquid sufficient to move the platform at a speed and in a direction dependent upon the speed and direction of the pilot motor means; the threads of said meshing screw and nut members having such steep pitch that the valve control shaft may be forcibly moved axially independently of rotary movements applied to the driven member and to the valve control shaft; follower mechanism connected to move with the valve control shaft as the latter moves axially and including a rocker lever and a coupling operative to connect and disconnect the mechanism without disturbing the connection between the rocker lever and the valve control shaft; a pair of directional cams carried by the cam shaft for operating the follower mechanism to move the valve means in a closing direction as stop positions are approached; first and second means normally disconnected and each manually connectable and operable to drive said transmission means to rotate the valve control shaft manually; said first means being operable at a position commanding a view of the platform as it approaches stop positions and the second means being operable at a position with the view of the platform as it approaches stop position obscured; means utilizing one of the coupling members upon disconnection of the coupling to lock the drive shaft against angular movement so that the valve means may be controlled by operation of said first manual means when the means for rotating the drive shaft in response to movement of the movable component becomes ineffective; a clutch operable to connect or disconnect the driving relation of said first manual means with the transmission means; and means operable pursuant to uncoupling of the link from the rocker lever to limit opening movement of the valve means in response to operation of said second manual means for a slow creeping speed of the platform such that the latter may be stopped by engagement with its stops without undesired impact.

JAMES DUNLOP.